(12) United States Patent
Watanabe (10) Patent No.: US 12,211,532 B2
(45) Date of Patent: Jan. 28, 2025

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toru Watanabe, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/454,636

(22) Filed: Aug. 23, 2023

(65) Prior Publication Data
US 2024/0321308 A1    Sep. 26, 2024

(30) Foreign Application Priority Data
Mar. 23, 2023 (JP) .................... 2023-046849

(51) Int. Cl.
| G11B 5/54 | (2006.01) |
| G11B 5/60 | (2006.01) |
| G11B 11/10 | (2006.01) |
| G11B 5/00 | (2006.01) |

(52) U.S. Cl.
CPC ............ G11B 5/607 (2013.01); G11B 5/6029 (2013.01); *G11B 2005/0021* (2013.01)

(58) Field of Classification Search
CPC .. G11B 5/54; G11B 27/36; G11B 5/00; G11B 5/09; G11B 5/1278; G11B 5/607; G11B 5/6029; G11B 11/105; G11B 2005/0021; G11B 11/10

USPC ....................................... 360/75, 59
See application file for complete search history.

(56) References Cited

U.S. PATENT DOCUMENTS

| 4,777,544 A | 10/1988 | Brown et al. |
| 5,377,058 A | 12/1994 | Good et al. |
| 7,342,736 B1* | 3/2008 | Turner .................. G11B 21/12 |
| 7,605,997 B2 | 10/2009 | Yamazaki |
| 2005/0046982 A1 | 3/2005 | Liu et al. |
| 2007/0230013 A1 | 10/2007 | Yokohata et al. |

(Continued)

FOREIGN PATENT DOCUMENTS

| JP | 2004-303318 A | 10/2004 |
| JP | 2008-217841 A | 9/2008 |

(Continued)

*Primary Examiner* — Nabil Z Hindi
(74) *Attorney, Agent, or Firm* — Knobbe Martens Olson & Bear, LLP (57) ABSTRACT

According to one embodiment, a disk device includes a disk-shaped recording medium, a magnetic head including a write head, a read head, and a heater, and a controller including a reference signal generator outputting a reference signal having a constant voltage amplitude at the same frequency as a high-frequency component of a gap measurement signal recorded in the recording medium, a measurer measuring a component amplitude of a reproduced signal of the gap measurement signal and an amplitude of the reference signal, and a heater controller controlling a power value of heater power supplied to the heater based on the measured values of the component amplitude and the amplitude of the reference signal.

7 Claims, 9 Drawing Sheets

(56) References Cited

U.S. PATENT DOCUMENTS

2008/0186619 A1  8/2008  Yamazaki
2011/0317302 A1  12/2011 Sakai et al.
2012/0229928 A1  9/2012  Sakai

FOREIGN PATENT DOCUMENTS

| JP | 4805860 B2 | 11/2011 |
| JP | 4818449 B1 | 11/2011 |
| JP | 2012-190519 A | 10/2012 |

* cited by examiner

DISK DEVICE

CROSS-REFERENCE TO RELATED APPLICATIONS

This application is based upon and claims the benefit of priority from Japanese Patent Application No. 2023-046849, filed Mar. 23, 2023, the entire contents of which are incorporated herein by reference.

FIELD

Embodiments described herein relate generally to a disk device.

BACKGROUND

As a disk device, for example, a magnetic disk device comprises a rotatable disk-shaped recording medium having a magnetic recording layer, and a magnetic head that records and reproduces data on the magnetic recording layer of the recording medium. The magnetic head includes a slider and a read head and a write head provided on the slider. In such a magnetic disk device, it is necessary to reduce the gap between the magnetic head and the recording medium in order to improve the recording density, especially linear recording density.

To reduce the above gap, a magnetic disk device comprising a magnetic head including a thermal actuator has been proposed. According to this magnetic disk device, the gap can be reduced by causing part of the slider, the read head, and the write head to bulge toward the surface of the recording medium by means of the thermal actuator.

As the above gap is narrowed, the influence on the gap change due to environmental changes in the surrounding environment or in the magnetic disk device increases, which, in some cases, causes the magnetic head and the recording medium to come in contact, thereby damaging the reliability of the magnetic disk device. Therefore, a method of measuring the gap change between the magnetic head and the recording medium has been proposed. There are two known methods: one is to measure the gap change from the amplitude change of a first-order component and a third-order component of a reproduced signal, and the other is to measure the gap change using a servo pattern as a signal.

In either method, once the signal is recorded, the thermal relaxation of the recording medium attenuates the signal, resulting in a large error in long-term measurement. In order to correct the effect of thermal relaxation, a technique has been proposed to record signals with different recording frequencies on two tracks and to correct the thermal relaxation from the reproduced signals of both tracks. However, this method requires the magnetic head to be moved between tracks, which increases processing time and latency. This latency is a factor that reduces the processing speed of the magnetic disk device.

DETAILED DESCRIPTION

Various embodiments will be described hereinafter with reference to the accompanying drawings. In general, according to one embodiment, a disk device comprises a disk-shaped recording medium on which a gap measurement signal containing a high-frequency component is recorded; a magnetic head comprising a write head, a read head, and a heater to adjust the gap between the recording medium; and a controller including a reference signal generator outputting a reference signal having a constant voltage amplitude at the same frequency as the high-frequency component, a measurer measuring a component amplitude of a reproduced signal of the gap measurement signal and an amplitude of the reference signal, and a heater controller controlling a power value of heater power supplied to the heater based on the measured values of the component amplitude and the amplitude of the reference signal.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings are denoted by like reference numerals, and a detailed description thereof may be omitted unless otherwise necessary.

First Embodiment

Figure 1:
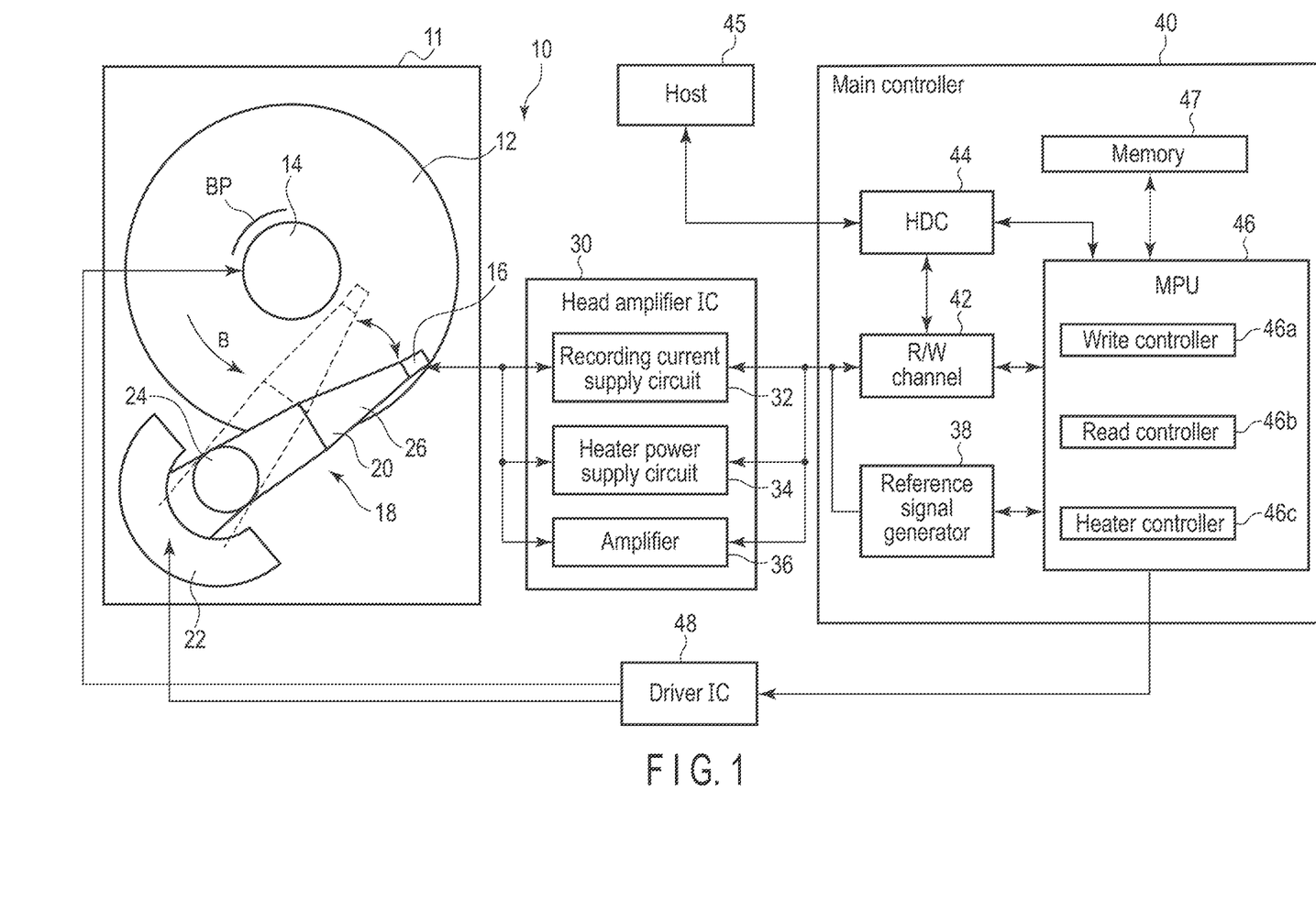
FIG. 1 is a block diagram schematically showing a hard disk drive (HDD) according to a first embodiment.
Figure 2:
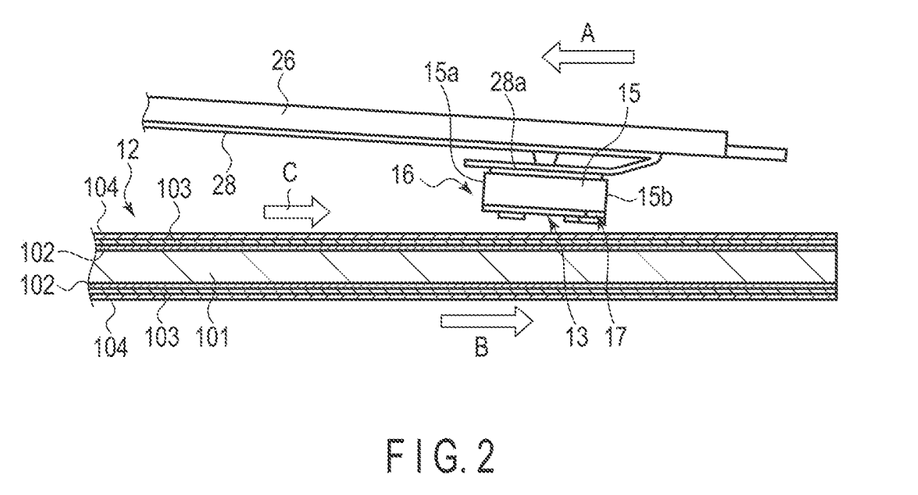
FIG. 2 is a side view schematically showing a magnetic head, suspension, and magnetic disk in the HDD.

As an example of a disk device, a hard disk drive (HDD) according to a first embodiment will be described in detail. FIG. 1 is a block diagram schematically showing the HDD according to the first embodiment, and FIG. 2 is a side view showing a magnetic head in a flying state and a magnetic disk.

As shown in FIG. 1, an HDD 10 comprises a rectangular-shaped housing 11, a magnetic disk 12 as a recording medium located in the housing 11, a spindle motor 14 that supports and rotates the magnetic disk 12, and a plurality of magnetic heads 16 that record (write) and reproduce (read) data with respect to the magnetic disk 12. The HDD 10 comprises a head actuator 18 that moves and positions the magnetic heads 16 on any track on the magnetic disk 12. The head actuator 18 includes a carriage assembly 20 that movably supports the magnetic heads 16 and a voice coil motor (VCM) 22 that rotates the carriage assembly 20.

The HDD 10 comprises a controller that includes a head amplifier IC 30 that drives the magnetic heads 16, a main controller 40, and a driver IC 48. The head amplifier IC 30 is provided on the carriage assembly 20, for example, and is electrically connected to the magnetic heads 16. The head amplifier IC 30 comprises a recording current supply circuit (recording current supply section) 32 that supplies recording current to a recording coil of the magnetic head 16, a heater power supply circuit 34 that supplies driving power to a thermal actuator (heater) of the magnetic head 16 as described below, and an amplifier 36 that amplifies signals read by the magnetic head 16, etc.

The main controller 40 and the driver IC 48 are configured, for example, on a control circuit board, not shown, located on a rear side of the housing 11. The main controller 40 comprises an R/W channel 42, a hard disk controller (HDC) 44, a microprocessor (MPU) 46, a memory 47, and a reference signal generator 38, etc. In the present embodiment, the R/W channel 42 also serves as a measurer that measures an amplitude of a reproduced signal. The main controller 40 is electrically connected to the magnetic head 16 via the head amplifier IC 30. The main controller 40 is electrically connected to the VCM 22 and the spindle motor 14 via the driver IC 48. The HDC 44 can be connected to a host computer 45.

The memory 47 of the main controller 40 stores various measured values, heater power setting values, etc., described later. In the main controller 40, for example, the MPU 46 includes a write controller 46a that controls a write head, a read controller that controls a read head, and a heater controller 46c that controls power supplied to the thermal actuator. The reference signal generator 38 generates a reference signal for gain fluctuation correction when measuring a gap change amount (levitation amount) of the magnetic head 16, as described later.

As shown in FIG. 1 and FIG. 2, the magnetic disk 12 is configured as a perpendicular magnetic recording medium. The magnetic disk 12 includes a substrate 101 made of a non-magnetic material formed in the shape of a disk, for example, 96 mm (approximately 3.5 inches) in diameter. On each surface of the substrate 101, a soft magnetic layer 102 made of a material exhibiting soft magnetic properties as a base layer, a perpendicular magnetic recording layer 103 having magnetic anisotropy perpendicular to the surface of the magnetic disk 12, and a protective film 104 are sequentially layered on the top layer. The magnetic disks 12 are coaxially fitted to the hub of the spindle motor 14. The magnetic disks 12 are rotated by the spindle motor 14 in the direction of arrow B at a predetermined speed. Note that a gap measurement signal pattern BP including high-frequency components is recorded on one track of the magnetic disk 12, which will be described later.

The carriage assembly 20 includes a bearing portion 24 rotatably supported by the housing 11 and a plurality of suspensions 26 extending from the bearing portion 24. As shown in FIG. 2, a magnetic head 16 is mounted on an extending end of each suspension 26. The magnetic head 16 is electrically connected to the head amplifier IC 30 via a wiring member (flexure) 28 provided on the carriage assembly 20.

As shown in FIG. 2, the magnetic head 16 is configured as a levitating head and comprises a slider 15 formed in an approximately rectangular shape and a head portion 17 formed at an outflow end (trailing) side of the slider 15. The slider 15 is formed, for example, of sintered alumina and titanium carbide (Altic), and the head portion 17 is formed by multiple layers of thin film. The slider 15 is attached to a gimbal portion 28a of the wiring member 28.

The slider 15 has an approximately rectangular disk-facing surface (air bearing surface (ABS)) 13 facing the surface of the magnetic disk 12. The slider 15 is maintained in a state of being lifted a predetermined amount from the surface of the magnetic disk 12 by an airflow C generated between the disk surface and the ABS 13 by the rotation of the magnetic disk 12. The direction of the airflow C coincides with the direction of rotation B of the magnetic disk 12. The slider 15 includes a leading end 15a located on an inflow side of the airflow C and a trailing end 15b located on an outflow side of the airflow C. As the magnetic disk 12 rotates, the magnetic head 16 runs in the direction of arrow A (head running direction) with respect to the magnetic disk 12, i.e., in the direction opposite to the disk rotation direction B.

Figure 3:
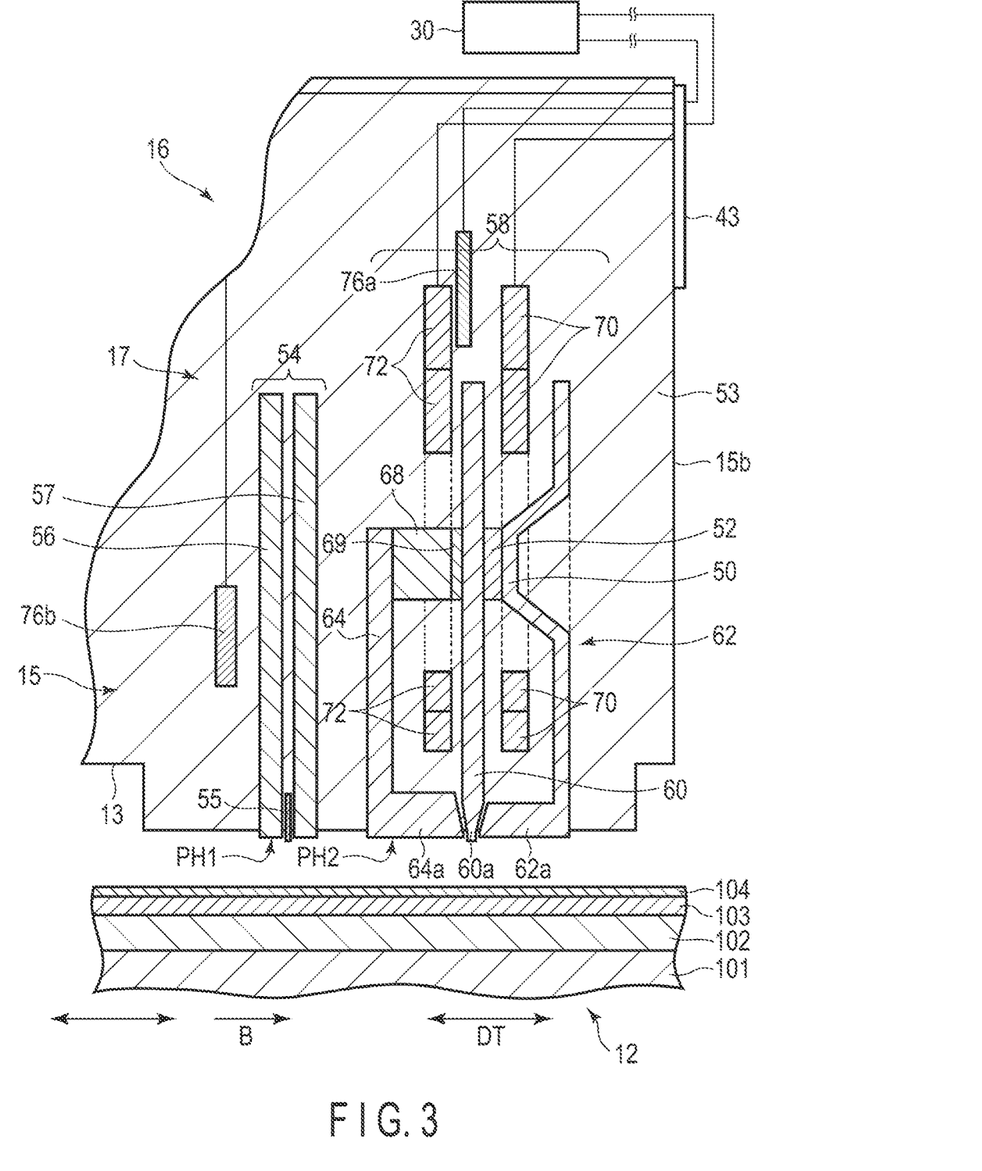
FIG. 3 is a cross-sectional view showing an enlarged head portion of the magnetic head.

FIG. 3 shows an enlarged cross-sectional view of the head portion 17 of the magnetic head 16 and the magnetic disk 12.

As shown in FIG. 3, the head portion 17 is formed as a separate magnetic head with a playback head (read head) 54 and a record head (write head) 58 formed by a thin-film process on the trailing end 15b of the slider 15. The read head 54 and the write head 58 are covered by a non-magnetic protective insulating film 53, except for the portion of the slider 15 exposed to the ABS 13. The protective insulating film 53 configures the outline of the head portion 17. Furthermore, the head portion 17 includes a first thermal actuator that controls the protrusion of the write head 58 and a second thermal actuator that controls the protrusion of the read head 54. The first thermal actuator includes, for example, a heater 76a, which is embedded in the protective insulating film 53 and located near the write head 58. The second thermal actuator includes, for example, a heater 76b, which is embedded in the protective insulating film 53 and located near the read head 54.

The longitudinal direction of a recording track formed on the perpendicular magnetic recording layer 103 of the magnetic disk 12 is defined as a down-track direction DT, and the width direction of the recording track orthogonal to the longitudinal direction is defined as a cross-track direction.

The read head 54 includes a magnetoresistive element 55, and a first magnetic shielding film 56 and a second magnetic shielding film 57 arranged to sandwich the magnetoresistive element 55 on the leading side (inflow side) and trailing side (outflow side) of the magnetoresistive element 55 in the down-track direction DT. The magnetoresistive element 55 and the first and second magnetic shielding films 56 and 57 extend approximately perpendicular to the ABS 13. The lower ends (distal ends) of the magnetoresistive element 55 and the first and second magnetic shielding films 56 and 57 protrude slightly from the ABS 13 and configure a first protrusion HP1. In the first protrusion HP1, the protrusion of the distal end of the magnetoresistive element 55 is greater than the protrusion of the distal ends of the first and second magnetic shielding films 56 and 57, and the distal end of the magnetoresistive element 55 protrudes beyond the first and second magnetic shielding films.

The write head 58 is provided on the trailing end 15b side of the slider 15 with respect to the read head 54. The write head 58 comprises a main magnetic pole 60 that generates a recording magnetic field in a direction perpendicular to the surface of the magnetic disk 12, a trailing shield 62 on the trailing side of the main magnetic pole 60 and facing the main magnetic pole 60 with a write gap, a leading shield 64 facing the leading side of the main magnetic pole 60, and a pair of side shields, not shown, formed integrally with the trailing shield 62. The main magnetic pole 60 and the trailing shield 62 configure a first magnetic core forming a magnetic path, and the main magnetic pole 60 and the leading shield 64 configures a second magnetic core forming a magnetic path. The write head 58 includes a first recording coil 70 wound around the first magnetic core and a second recording coil 72 wound around the second magnetic core.

The main magnetic pole 60 is formed from a soft magnetic material having high permeability and high saturation magnetic flux density and extends substantially perpendicular to the ABS 13. A distal end portion 60a of the main magnetic pole 60 on the ABS 13 side is tapered toward the ABS 13 to form a narrow columnar shape with respect to the other portions. The distal end portion 60a of the main magnetic pole 60 protrudes slightly from the ABS 13 of the slider 15.

The trailing shield 62 is formed of a soft magnetic material to efficiently close the magnetic path through the soft magnetic layer 102 of the magnetic disk 12 directly below the main magnetic pole 60. The trailing shield 62 is formed in a substantially L-shape, and a distal end portion 62a thereof is formed in an elongated rectangular shape. The distal end portion 62a of the trailing shield 62 protrudes slightly from the ABS 13 of the slider 15.

The trailing shield 62 has a first connection portion 50 connected to the main magnetic pole 60. The first connection portion 50 is magnetically connected to the upper part of the main magnetic pole 60, i.e., a part of the main magnetic pole 60 distant from the ABS 13, via a non-conductor 52. The first recording coil 70 is wound around the first connection portion 50, for example, in the first magnetic core. When writing signals to the magnetic disk 12, by applying a recording current to the first recording coil 70, the first recording coil 70 excites the main magnetic pole 60 and causes a magnetic flux to flow to the main magnetic pole 60.

The leading shield 64 made of a soft magnetic material is provided on the leading side of the main magnetic pole 60 facing the main magnetic pole 60. The leading shield 64 is formed in a substantially L-shape, and a distal end portion 64a on the ABS 13 side is formed in an elongated rectangular shape. The distal end portion 64a protrudes slightly from the ABS 13 of the slider 15.

The leading shield 64 also has a second connection portion 68 joined to the main magnetic pole 60 at a distance from the ABS 13. This second connection portion 68 is formed, for example, of a soft magnetic material and is magnetically connected to the upper part of the main magnetic pole 60, i.e., a part of the main magnetic pole 60 distant from the ABS 13, via a non-conductor 69. As a result, the second connection portion 68 forms a magnetic circuit together with the main magnetic pole 60 and the leading shield 64. The second recording coil 72 of the write head 58, for example, is wound around the second connection portion 68 to apply a magnetic field to this magnetic circuit.

As described above, the distal end portion 60a of the main magnetic pole 60, the distal end portion 62a of the trailing shield 62, and the distal end portion 64a of the leading shield 64 protrude slightly from the ABS 13 and form a second protrusion HP2.

As shown in FIG. 3, a plurality of connection terminals 43 are provided at the trailing end 15b of the slider 15. The first recording coil 70 and the second recording coil 72 are each connected to the connection terminals 43 via wiring lines and are further connected to the head amplifier IC 30 via the flexure 28. When writing signals to the magnetic disk 12, a recording current is supplied to the first recording coil 70 and the second recording coil 72 from the recording current supply circuit 32 of the head amplifier IC 30 to excite the main magnetic pole 60 and cause magnetic flux to flow to the main magnetic pole 60. The recording current supplied to the first recording coil 70 and the second recording coil 72 is controlled by the main controller 40.

Similarly, the magnetoresistive element 55 of the read head 54 is connected to the connection terminal 43 via a wiring line (not shown), and is further connected to the head amplifier IC 30 via the flexure 28. The signal read by the read head 54 is amplified by the head amplifier IC 30 and sent to the main controller 40.

The first and second heaters 76a and 76b, respectively, are connected to the connection terminal 43 via a wiring line and further connected to the head amplifier IC 30 via the flexure 28. By applying driving power to the first heater 76a and the second heater 76b from the heater power supply circuit 34 of the head amplifier IC 30, the heaters and the surroundings of the heaters can be heated to cause the write head 58 or the read head 54 to expand toward the magnetic disk 12. The heater power supplied to the first and second heaters 76a and 76b is controlled by the heater controller 46c of the main controller 40.

Next, an operation of measuring and adjusting the space (gap) between the write head 58 and read head 54 of the magnetic head 16 and the surface of the magnetic disk 12 in the HDD 10 configured as described above will be described. The HDD 10 performs gap measurement and adjustment operations at the time of shipment, at regular intervals, or at each recording operation.

Figure 4:
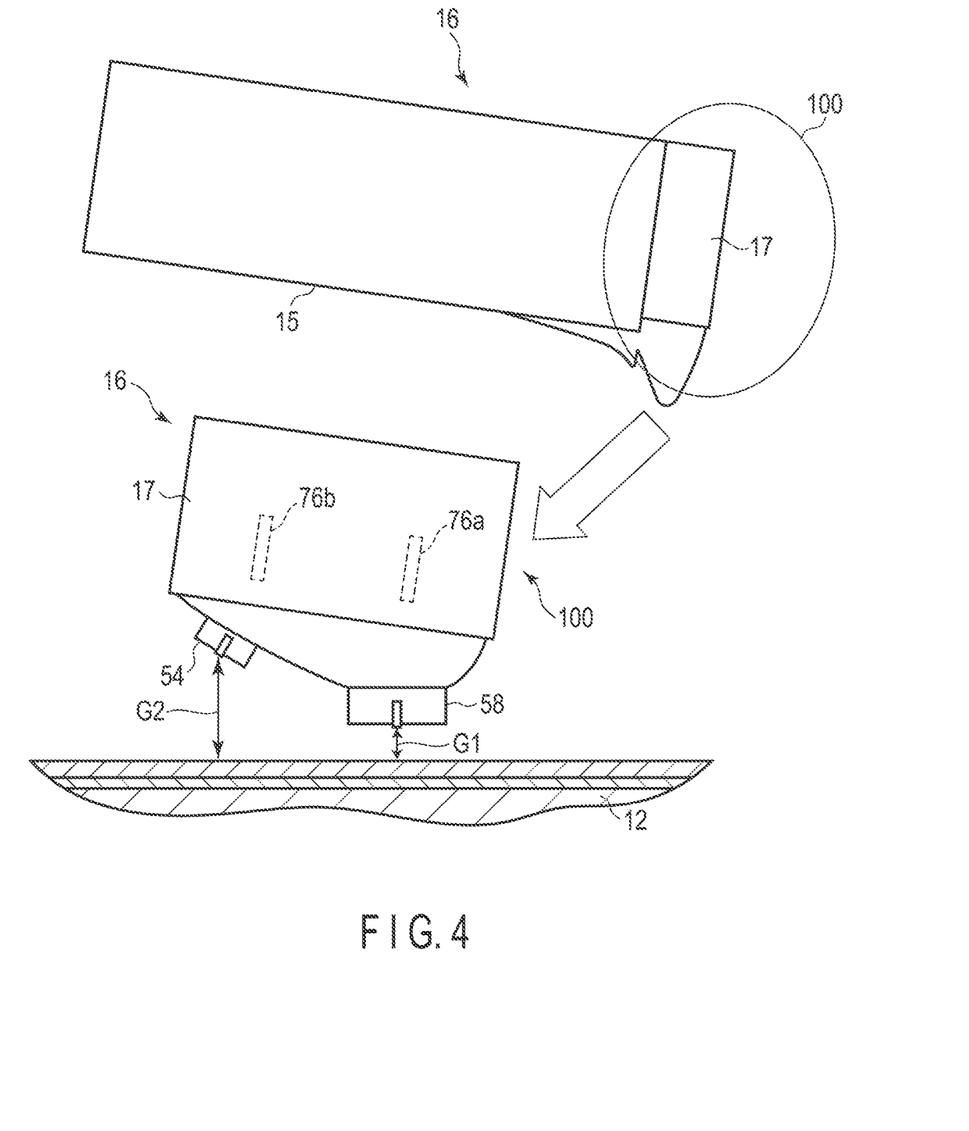
FIG. 4 is a side view schematically showing the magnetic head and the head portion in a state where a recording head portion is protruded by a thermal actuator.

FIG. 4 is a side view of the head portion schematically showing a state in which the write head portion is expanded toward the magnetic disk 12 by the first heater 76a during recording operation. As shown in the drawing, during recording operation, heater power of a predetermined power value is supplied to the first and second heaters 76a and 76b from the heater power supply circuit 34, and the first and second heaters are heated. As a result, the write head 58 and its surroundings are heated and expanded toward the surface of the magnetic disk 12, setting a gap G1 between the write head 58 and the disk surface to a predetermined value. By increasing the power value supplied to the heater, the amount of protrusion increases and the gaps G1 and G2 decrease. By decreasing the power value supplied to the heater, the amount of protrusion decreases and the gaps G1 and G2 increase. The heater controller 46c and the heater power supply circuit 34 control the degree of heating (power supply value) of the first and second heaters 76a and 76b so that the gaps G1 and G2 have desired values. The magnetic head 16 executes recording operations in a state where it is set to predetermined gaps G1 and G2.

For example, in the operation of measuring and adjusting the gaps G1 and G2 at the time of HDD shipment, first, the main controller 40 increases the power supply values of the first and second heaters 76a and 76b until the write head 58 and read head 54 contact the magnetic disk 12 (touchdown), and the power values upon contact are stored in the memory 47. The main controller 40 reads the gap measurement signal pattern BP of the magnetic disk 12 with the read head 54 in a state where the write head 58 and the read head 54 are in contact with the magnetic disk 12. The main controller 40 measures a first-order component amplitude (V01) and a third-order component amplitude (V03) of the read reproduced signal with the R/W channel 42 and stores the measured values in the memory 47 as initial amplitude values. The main controller 40 then reads the gap measurement signal pattern BP of the magnetic disk 12 while gradually reducing the heater supply power value, i.e., the head protrusion amount. The first-order component amplitude (V11) and the third-order component amplitude (V13) of the read reproduced signal are measured, and the measured values are stored in the memory 47.

The main controller 40 calculates the amount of change in gap Δd using the following Equation (1) and determines the heater power control amount (heater power value) when Δd becomes the desired gap. The amount of change in the gap can be calculated according to the difference between the ratio of initial values V01 and V03 and the ratio of the measured values V11 and V13 after the heater power value is reduced. The determined heater power control amount (heater power value) is stored in the memory 47. After measurement, during recording and playback, the main controller 40 sets the power value supplied to the heater to the above determined power value.

$$\triangle d = \frac{\lambda}{4\pi}\left(\ln\frac{V_{11}}{V_{13}} - \ln\frac{V_{01}}{V_{03}}\right) \quad (1)$$

In Equation (1), Δd: gap change and λ: wavelength of fundamental frequency.

Figure 5:
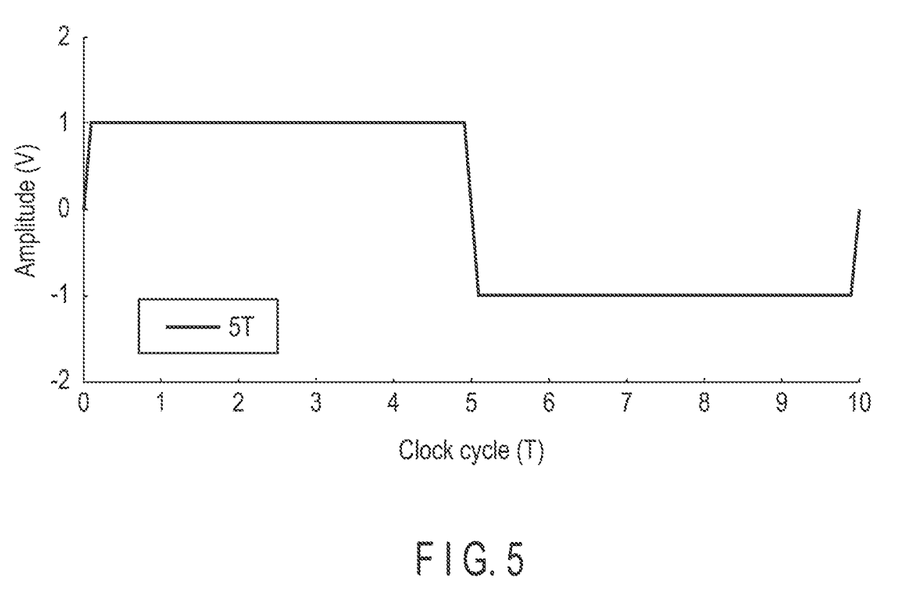
FIG. 5 is a view showing a waveform of a gap measurement signal pattern according to a comparative example.
Figure 6:
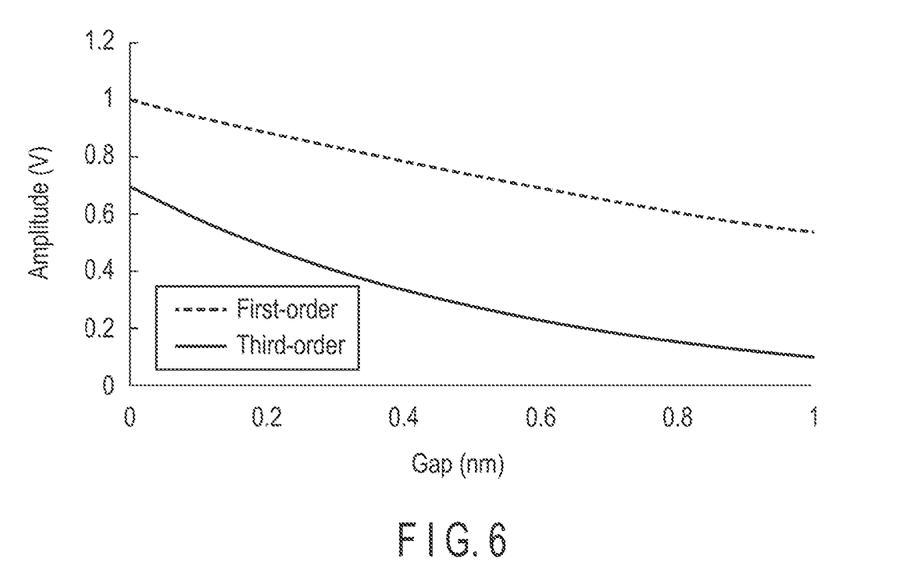
FIG. 6 is a view showing the relationship between a first-order component amplitude and a third-order component amplitude of a reproduced signal and a gap in comparison.
Figure 7:
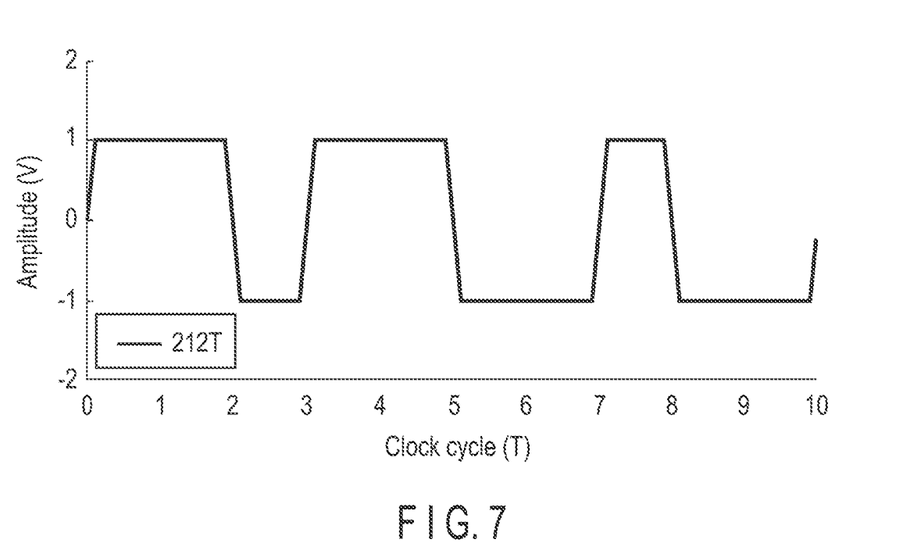
FIG. 7 is a view showing the waveform of the gap measurement signal pattern according to the first embodiment.

FIG. 5 shows the gap measurement signal pattern of the HDD according to a comparative example, and FIG. 6 shows the relationship between the first-order component amplitude and third-order component amplitude of the reproduced signal and the gap change. FIG. 7 shows the gap measurement signal pattern of the HDD according to the present embodiment.

In the gap measurement described above, in a case where the gap measurement signal pattern recorded on the magnetic disk 12 is, for example, a square wave pattern (5T) with magnetization reversal every 5T clocks as shown in FIG. 5, the third-order component amplitude of the read reproduced signal becomes smaller than the first-order component amplitude, and the measurement error may become larger.

Therefore, in the HDD according to the present embodiment, the gap measurement signal pattern BP shown in FIG. 7 is used. The gap measurement signal pattern BP is a square wave pattern including high-frequency waves with magnetization reversal at every 2T, 1T, and 2T clock cycles, and is referred to as a so-called 212T pattern. In the case of a perpendicular magnetic recording method, the polarity of the reproduced signal is also reversed where the magnetization state of the recording medium is reversed. A recording signal is reversed in synchronization with the clock. If the reversal timing is 2T (for two 2 clocks), 1T, and 2T (212T pattern), ideally, the reproduced signal shown in FIG. 6 is obtained. At this time, the wavelength of the fundamental frequency of the entire reproduced signal is 10T.

Figure 8:
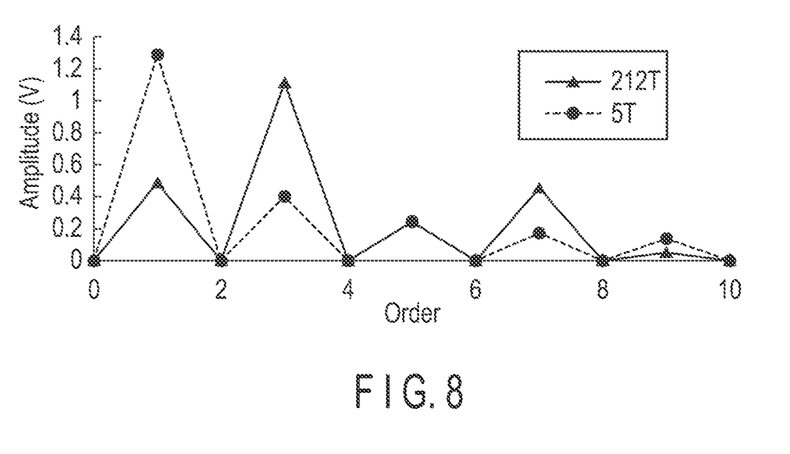
FIG. 8 is a view showing a comparison of frequency component amplitudes of the reproduced signal for a gap measurement signal according to the comparative example and a gap measurement signal according to the first embodiment.

As shown in FIG. 5, the gap measurement signal pattern according to the comparative example is a square wave written with the same 10T wavelength, and magnetization reversal is performed every 5T (5T pattern). FIG. 8 shows the order component amplitude of the reproduced signal of the gap measurement signal pattern (5T) according to the comparative example and the order component amplitude of the reproduced signal of the gap measurement signal pattern (212T) according to the present embodiment.

When the reproduced signals of the gap measurement signal pattern (5T) and the gap measurement signal pattern (212T) are respectively diffusion Fourier transformed and compared by each frequency component, the third-order component amplitude of the reproduced signal of the 212T pattern is more than twice as large as the third-order component amplitude of the reproduced signal of the 5T pattern as shown in FIG. 8. That is, by using the gap measurement signal pattern (212T), it is possible to increase the third-order component amplitude. In the present embodiment, the amount of gap change in the write head and read head can be measured based on the change in the third-order component amplitude.

Figure 9:
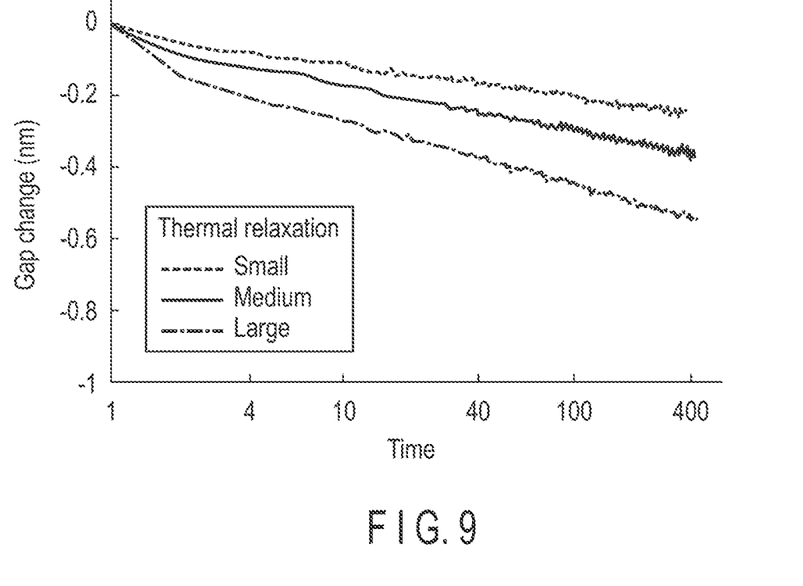
FIG. 9 is a view showing a comparison of the effect of thermal relaxation on a gap change.

In order to confirm the effect of thermal relaxation, three types of recording media (magnetic disks) with different thermal relaxation characteristics (small, medium, and large) were prepared, and the gap measurement of the magnetic head described above was performed for each recording media at a high temperature, for example, in an environment of 60° C. FIG. 9 shows the measurement results. The amount of gap change is obtained by Equation (1).

As shown in FIG. 9, the gap change appears to be larger in the order of thermal relaxation (small, medium, and large). This gap change is considered to be the effect of thermal relaxation, not the actual gap change. In the case of perpendicular magnetic recording, since the effect of thermal relaxation appears to be smaller at higher recording frequencies, the gap change was confirmed from the amplitude change of the first-order and third-order components, respectively. In this case, the amount of gap change is calculated by the following Equations (2) and (3).

Equation (2) in the case where the first-order component amplitude is used is $$\triangle d = -\frac{\lambda}{2\pi}\ln\frac{V_{11}}{V_{01}} \quad (2)$$

Equation (3) in the case where the third-order component amplitude is used is $$\triangle d = -\frac{1/3\lambda}{2\pi}\ln\frac{V_{13}}{V_{03}} \quad (3)$$

Here, in Equations (2) and (3), the former 0 in the subscript of the symbol V indicates the measured value at the reference gap, and 1 indicates the measured value at the time of measuring the gap change. The latter of the subscripts represents the order.

Figure 10:
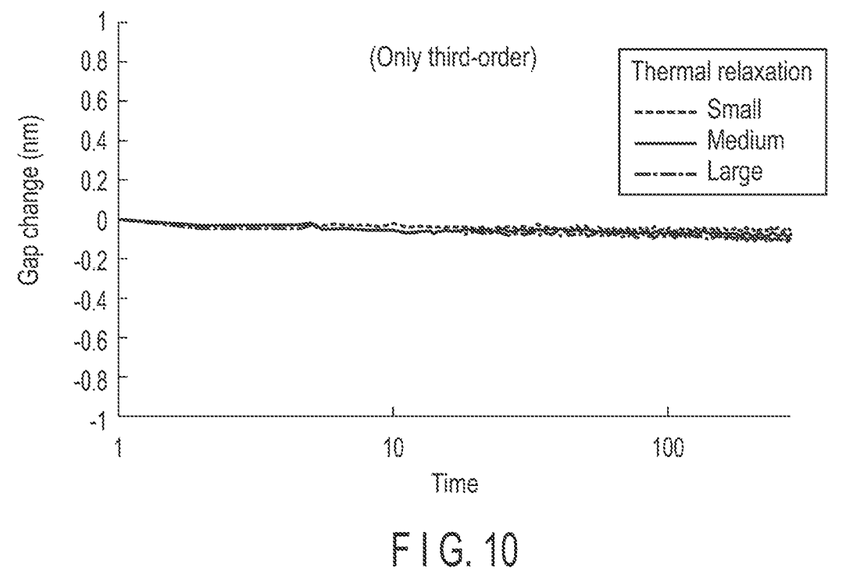
FIG. 10 is a view showing the degree of influence of thermal relaxation of the third-order component amplitude on the gap change.
Figure 11:
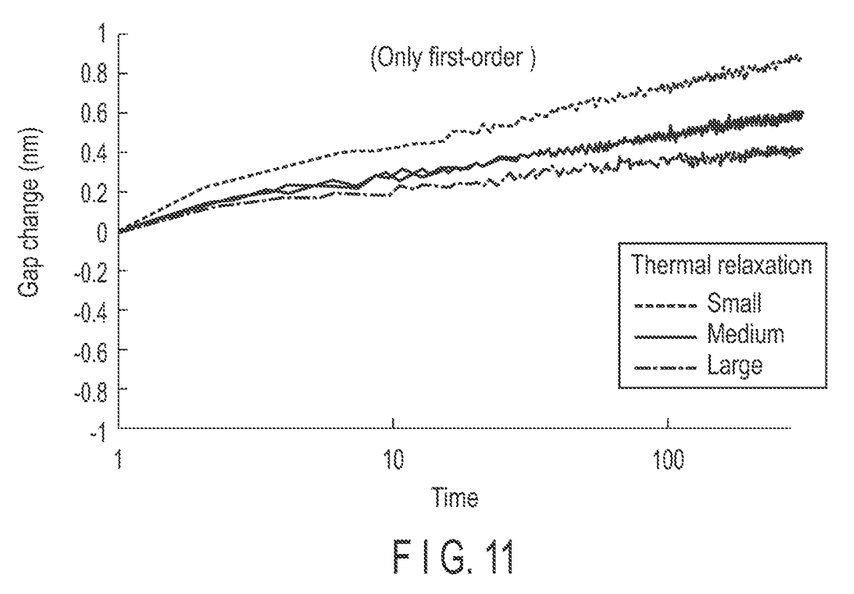
FIG. 11 is a view showing the degree of influence of thermal relaxation of the first-order component amplitude on the gap change.

FIG. 10 shows the gap change measured only by the third-order component amplitude, and FIG. 11 shows the gap change measured only by the first-order component amplitude. As shown in FIG. 11, in a case where only the first-order component amplitude is used, it can be seen that the variation of the gap change increases in accordance with the thermal relaxation. That is, the magnitude of the gap change increases in accordance with the degree of thermal relaxation of the recording medium. As can be seen from Equation (2), the measured value V11 becomes smaller as time passes due to thermal relaxation.

On the other hand, as shown in FIG. 10, in a case where only the third-order component amplitude is used, there is little variation in the gap change in response to thermal relaxation, indicating that the effect of thermal relaxation of the recording medium hardly appears. Therefore, by recording the 212T pattern as the gap measurement signal pattern and calculating the amount of gap change from only the third-order component amplitude of the reproduced signal, it is possible to minimize the effect of thermal relaxation. In addition, in the case of using the gap measurement signal of the 212T pattern, the fundamental frequency of the reproduced signal need only be equivalent to (10/3)T for a fundamental wavelength of 10T, and the gain in the high frequency range can be maintained without any circuit design changes to the amplifier associated with gap measurement.

In a case where the gap change is calculated based only on the third-order component amplitude as described above, it may be affected by the gain fluctuation of the R/W channel 42. Therefore, it is desirable to remove the effect of gain fluctuation in the gap measurement. Therefore, according to the present embodiment, the HDD 10 comprises the reference signal generator 38 that outputs a reference signal having a constant voltage amplitude at the same frequency as the frequency of the third-order component. In one example, the reference signal generator 38 is provided inside the main controller 40. The main controller 40 outputs a reference signal from the reference signal generator 38 and measures the amplitude of the reference signal on the R/W channel 42 before performing the gap measurement described above. The main controller 40 records the measured value of the reference signal amplitude measured on the R/W channel 42 in the memory 47. During the gap measurement, the main controller 40 removes, i.e., corrects, the effect of gain fluctuation in the R/W channel 42 by dividing the third-order component amplitude V13 of the reproduced signal that reads the gap measurement signal pattern (212T) by the measured value of the reference signal amplitude. When the initial amplitude value of the reference signal at the reference gap is G01, and the measured amplitude value of the reference signal at the gap measurement is G11, the aforementioned Equation (3) for determining the gap fluctuation by the third-order component amplitude can be rewritten as follows.

$$\triangle d = -\frac{1/3\lambda}{2\pi}\ln\frac{V_{13}/G_{13}}{V_{03}/G_{03}} \quad (4)$$

As shown in Equation (4), the effect of gain fluctuation on the measured value can be removed by dividing the rate of change of the third-order component amplitude (V13/V03) by a gain fluctuation rate (G13/G03).

When the measured gap reaches the desired gaps G1 and G2, the main controller 40 stops reducing the power supplied to the heaters 72a and 72b, detects the power value of the heater power at that time, and records it in the memory 47. This completes the gap measurement and gap adjustment of the magnetic head 16. After measurement and adjustment, during HDD recording and playback, the main controller 40 sets the power value of the power supplied to the heater to the above determined power value.

After shipment, the HDD 10 executes the gap measurement and adjustment operation of the magnetic head, for example, at regular intervals. In this case, the main controller 40 measures the third-order component amplitude (V13) of the reproduced signal and the amplitude (G13) of the reference signal by the measurement process described above, and, by using these measured values (V13, G13), the initial amplitude values (V03) and (G03) stored in the memory 47 at the time of shipment, and the above Equation (4), calculates the amount of change in the gap, Δd. When the amount of change Δd reaches the desired gap G1 and G2, the main controller 40 detects the power value of the heater power at that time and stores it in the memory 47. Thereafter, during recording operation, the main controller 40 sets the power value of the heater supply power to the power value stored in the memory 47.

According to the HDD of the first embodiment configured as described above, in the gap adjustment of the magnetic head 16, the gap measurement is performed based on the third-order component amplitude of the gap measurement signal including high-frequency components, thereby minimizing the effect of thermal relaxation and improving measurement accuracy. The accuracy of single-frequency amplitude measurement can be improved, enabling highly accurate gap change measurement. In addition, the gap measurement signal only needs to be recorded on one track of the magnetic disk 12, and the magnetic head 16 can perform gap measurement by moving on one track during gap measurement. This reduces the travel time of the magnetic head and allows the gap measurement time to be reduced.

Furthermore, according to the first embodiment, the reference signal output from the reference signal generator 38 is used to detect the gain fluctuation rate of the R/W channel, and the gap measurement value is corrected according to the detected gain fluctuation rate, thereby removing the effect of gain fluctuation in the R/W channel. Therefore, the accuracy of gap measurement can be further improved. By controlling the heater power according to this gap measurement, the gap of the magnetic head can be kept constant.

As described above, according to the present embodiment, it is possible to shorten the gap measurement time and improve the gap measurement accuracy, and to obtain a disk device capable of setting the gap of the magnetic head to a predetermined value with high accuracy.

Next, an HDD of another embodiment will be described. In the other embodiment described below, the same reference symbols as in the first embodiment described above are given to the same parts as in the first embodiment, and the detailed description may be omitted or simplified.

Second Embodiment

Figure 12:
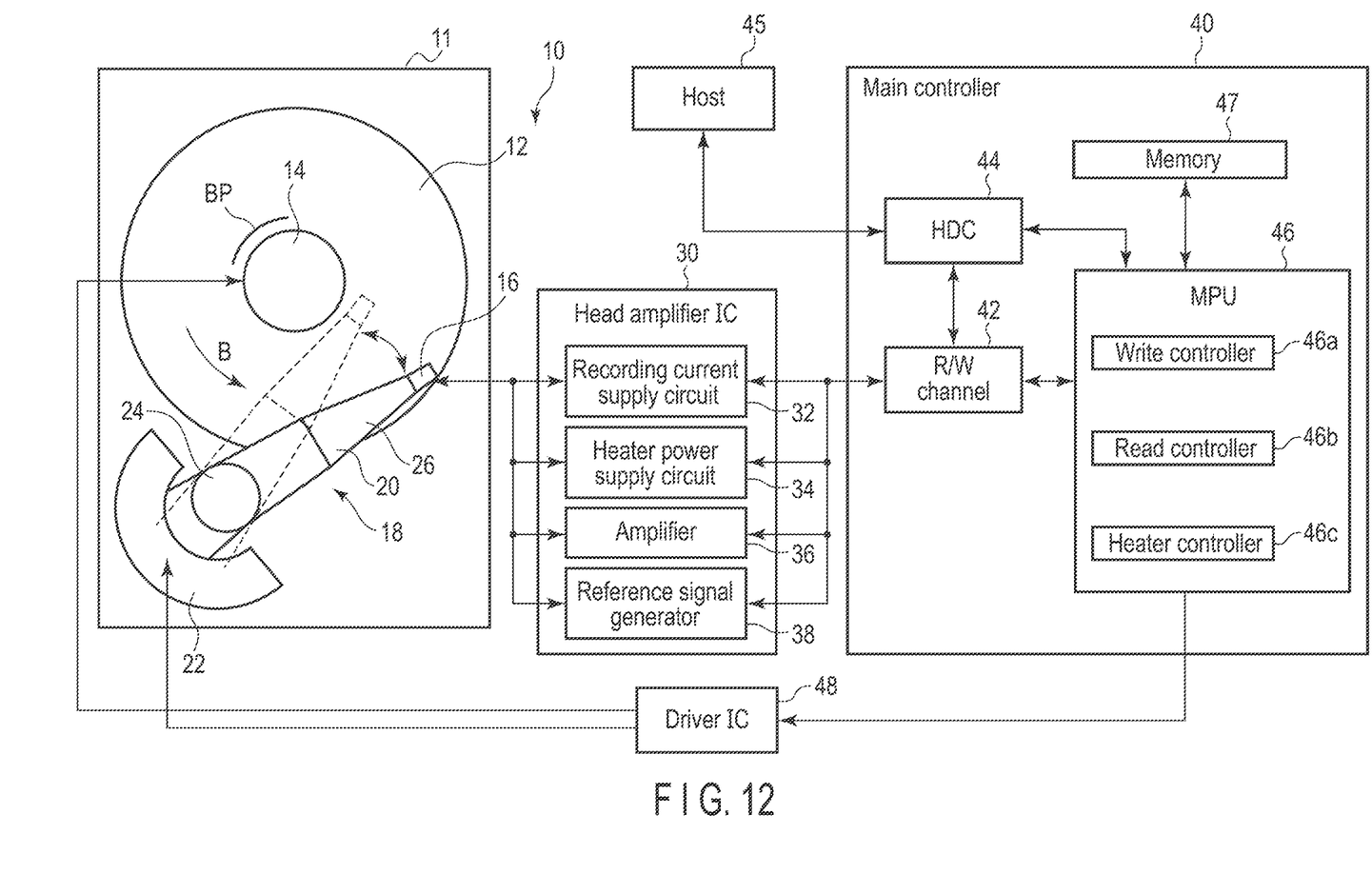
FIG. 12 is a block diagram schematically showing an HDD of a second embodiment.

FIG. 12 is a block diagram schematically showing an HDD of a second embodiment.

As shown in the drawing, according to the second embodiment, a reference signal generator 38 is provided inside a head amplifier IC 30. The reference signal generator 38 outputs a reference signal to an R/W channel 42 prior to gap measurement. A main controller 40 detects the amplitude of the reference signal by the R/W channel 42 and stores the detected value in a memory 47. During gap measurement, the main controller 40 corrects the gap measurement value according to the detected value of the reference signal.

In the second embodiment, the other configurations of the HDD are the same as those of the HDD in the first embodiment. In the second embodiment, the same effects as in the first embodiment described above can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, the pattern of the gap measurement signal is not limited to the 212T pattern, and various other patterns can be selected as long as the pattern is one in which the third-order component amplitude of the reproduced signal increases. The material, shape, size, etc., of the elements that configure the head portion of the magnetic head can be changed as needed. In a magnetic disk device, the number of magnetic disks and magnetic heads can be increased or decreased as needed, and various sizes of magnetic disks can be selected.

What is claimed is:

1. A disk device comprising:
a disk-shaped recording medium on which a gap measurement signal containing a high-frequency component is recorded;
a magnetic head comprising a write head, a read head, and a heater to adjust a gap between the recording medium and the magnetic head; and
a controller including a reference signal generator outputting a reference signal having a constant voltage amplitude at the same frequency as the high-frequency component, a measurer measuring a component amplitude of a reproduced signal of the gap measurement signal and an amplitude of the reference signal, and a heater controller controlling a power value of heater power supplied to the heater based on the measured values of the component amplitude and the amplitude of the reference signal; wherein
the controller calculates an amount of change in the gap based on a ratio between an initial value of a component amplitude of the reproduced signal measured in a state where the magnetic head is in contact with the recording medium and a measured value of a component amplitude of the reproduced signal measured in the state where the gap is generated, and a ratio between an initial value of the amplitude of the reference signal and the measured value of the amplitude of the reference signal.

2. A disk device comprising:
a disk-shaped recording medium on which a gap measurement signal containing a high-frequency component is recorded;
a magnetic head comprising a write head, a read head, and a heater to adjust a gap between the recording medium and the magnetic head; and
a controller including a reference signal generator outputting a reference signal having a constant voltage amplitude at the same frequency as the high-frequency component, a measurer measuring a component amplitude of a reproduced signal of the gap measurement signal and an amplitude of the reference signal, and a heater controller controlling a power value of heater power supplied to the heater based on the measure values of the component amplitude and the amplitude of the reference signal; wherein
the gap measurement signal includes a signal pattern in which a third-order component amplitude of a reproduced signal is larger than a first-order component amplitude of a reproduced signal, and the controller controls the power value of the heater power based on the amount of change in the third-order component amplitude.

3. The disk device of claim 2, wherein
in a case where a clock cycle of the gap measurement signal is T, the gap measurement signal includes a square wave pattern that reverses polarity every 2T, 1T, and 2T clock cycles.

4. The disk device of claim 1, wherein
the controller comprises a head amplifier IC including a heater power supply circuit and an amplifier, and a main controller including the measurer and the heater controller, and
the reference signal generator is provided in the main controller.

5. The disk device of claim 1, wherein
the controller comprises a head amplifier IC including a heater power supply circuit and an amplifier, and a main controller including the measurer and the heater controller, and
the reference signal generator is provided in the head amplifier IC.

6. The disk device of claim 2, wherein
the controller comprises a head amplifier IC including a heater power supply circuit and an amplifier, and a main controller including the measure and the heater controller, and
the reference signal generator is provided in the main controller.

7. The disk device of claim 2, wherein
the controller comprises a head amplifier IC including a heater power supply circuit and an amplifier, and a main controller including the measurer and the heater controller, and
the reference signal generator is provided in the head amplifier IC.

* * * * *